United States Patent
Ueda (10) Patent No.: US 7,489,372 B2
(45) Date of Patent: Feb. 10, 2009

(54) DISPLAY DEVICE AND METHOD OF ASSEMBLING THE DISPLAY DEVICE

(75) Inventor: Shiro Ueda, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 400 days.

(21) Appl. No.: 11/480,519

(22) Filed: Jul. 5, 2006

(65) Prior Publication Data
US 2007/0009820 A1    Jan. 11, 2007

(30) Foreign Application Priority Data
Jul. 8, 2005    (JP)    ............................. 2005-199860

(51) Int. Cl.
*G02F 1/1335*    (2006.01)
(52) U.S. Cl. .......................................... 349/62; 349/70
(58) Field of Classification Search ..................... 349/62
See application file for complete search history.

(56) References Cited

U.S. PATENT DOCUMENTS

2002/0044437 A1*  4/2002  Lee ............................. 362/31
2004/0257792 A1* 12/2004  Yu et al. ...................... 362/31

FOREIGN PATENT DOCUMENTS

JP           7-64084         8/1993

* cited by examiner

*Primary Examiner*—David Nelms
*Assistant Examiner*—Phu Vu
(74) *Attorney, Agent, or Firm*—Reed Smith LLP; Stanley P. Fisher, Esq.; Juan Carlos A. Marquez, Esq.

(57) ABSTRACT

A display device includes: a reflection plate; plural light sources disposed above the reflection plate; an optical member disposed above the plural light sources; a support member disposed standing on a bottom surface of the reflection plate; a frame member that houses the reflection plate and the light sources; and a display panel disposed above the optical member. The support member includes: a standing support portion that is disposed standing on and supports the reflection plate; an optical member support portion that supports the optical member; and a leg portion that protrudes downward of the reflection plate and the frame member and is bent in a direction along the standing support member.

7 Claims, 10 Drawing Sheets

DISPLAY DEVICE AND METHOD OF ASSEMBLING THE DISPLAY DEVICE

The present application claims priority from Japanese application JP2005-199860 filed on Jul. 8, 2005, the content of which is hereby incorporated by reference into this application.

BACKGROUND OF THE INVENTION

1. Field of the Invention

The present invention relates to a display device and a method of assembling the display device, and more particularly to technology effectively applied to a display device which includes support members that are disposed standing on a reflection plate and support an optical member disposed above the reflection plate.

2. Description of the Related Art

Conventionally, among display devices, there is a display device where light sources (a backlight unit) are disposed under (behind) a display panel, such as in a liquid crystal display device, for example.

The backlight unit is one where, for example, light sources such as cold-cathode fluorescent tubes are disposed above (in front of) a reflection plate, and where an optical member such as a light diffusion plate or an optical sheet is disposed above the light sources. A display panel is disposed above (in front of) the optical member.

Further, at this time, support members that support the optical member are disposed standing on the bottom surface of the reflection plate (e.g., see JP-A-7-64084).

In the backlight (lighting device) disclosed in JP-A-7-64084, an auxiliary reflection portion that protrudes inward in a chevron-like shape is integrally coupled at a width-direction intermediate portion of the bottom surface of the reflection plate and between a pair of fluorescent lamps. Part of the auxiliary reflective portion is formed as a planar surface, and the support member is disposed standing on this planar surface.

However, when the chevron-shaped auxiliary reflection portion and the planar surface are disposed on the bottom surface of the reflection portion, as in the reflection portion of the backlight disclosed in JP-A-7-64084, it is conceivable for there to be the problem that it becomes easy for the reflection portion to twist and bend such that the uniformity ratio of reflection light drops.

Figure 17:
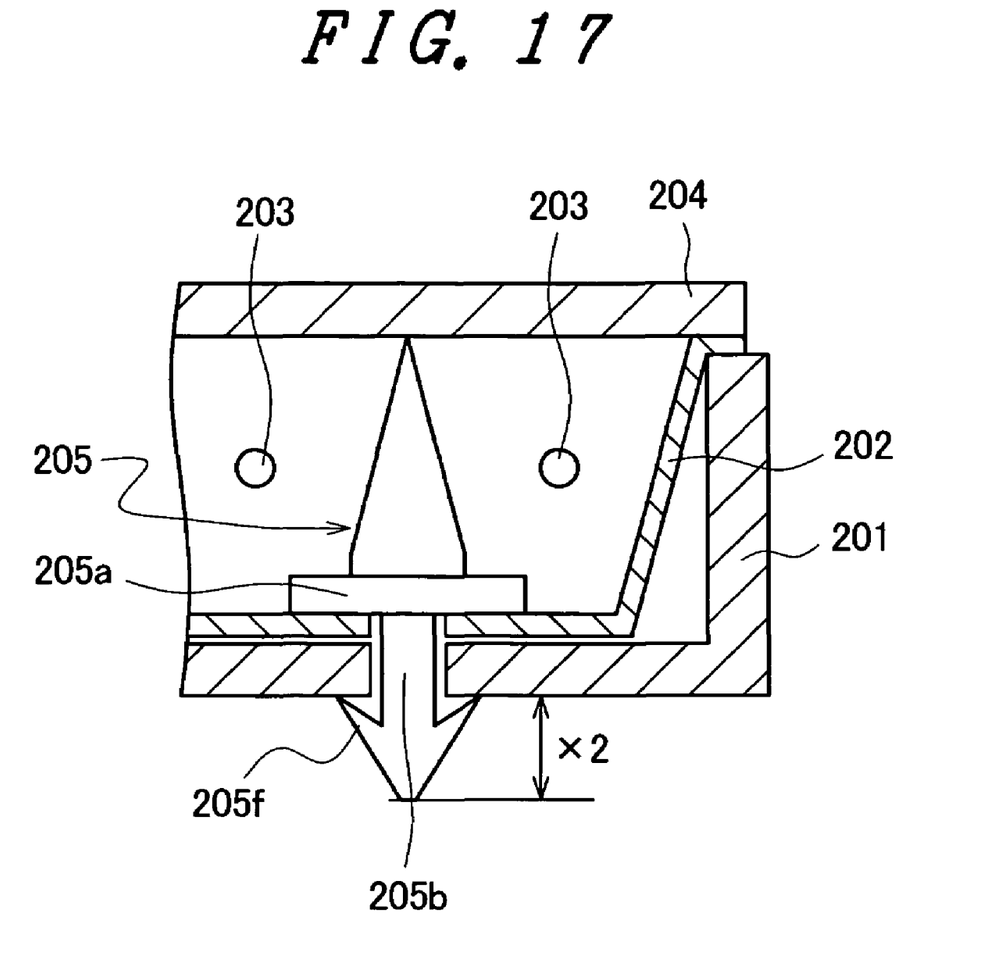
FIG. 17 is a schematic diagram for describing a conventional method of fixing a support member.

Thus, in recent years, a method has been proposed where, as shown in FIG. 17 for example, the bottom surface of a reflection plate 202 is made planar, holes through which a leg portion 205b of a support member 205 passes are disposed in the reflection plate 202 and in a frame member 201, and a pawl 205f of the leg portion 205b of the support member 205 catches on the frame member 201.

However, in the case of the method shown in FIG. 17, there has been the problem that when the support member 205 is to be attached, it is difficult to align the hole in the reflection plate 202 and the leg portion 205b of the support member 205, and the workability has been poor.

Further, in the case of the method shown in FIG. 17, it is easy for the problem of the pawl 205f of the support member 205 breaking and becoming extraneous, or that the support member 205 cannot be fixed, to arise.

Further, in the case of the method shown in FIG. 17, a protruding height x2 of the leg portion 205b of the support member 205 becomes large. For this reason, there is the problem that the attachment height becomes high when a circuit board including a circuit such as a timing controller is attached in the region where the leg portion 205b of the support member 205 protrudes, for example.

SUMMARY OF THE INVENTION

It is an object of the present invention to provide technology capable of improving workability when support members are to be attached to a reflection plate.

It is another object of the present invention to provide technology capable of reducing damage to the support members when the support members are to be attached to the reflection plate.

It is still another object of the present invention to provide technology capable of reducing the protruding height of leg portions of the support members when the support members are to be attached to the reflection plate.

These and other objects and novel characteristics of the present invention will become apparent from the description of this specification and the attached drawings.

The invention disclosed in this application can be described as follows.

A first aspect of the present invention provides a display device comprising: a reflection plate; plural light sources disposed above the reflection plate; an optical member disposed above the plural light sources; a support member disposed standing on a bottom surface of the reflection plate; a frame member that houses the reflection plate and the light sources; and a display panel disposed above the optical member, wherein the support member includes a standing support portion that is disposed standing on and supported by the reflection plate, an optical member support portion that supports the optical member, and a leg portion that protrudes downward of the reflection plate and the frame member and is bent in a direction along the standing support member.

In the first aspect, the reflection plate may include a hole through which the leg portion of the support member passes, and the hole in the reflection plate may include two sides parallel to the direction in which the leg portion of the support member is bent.

Further, in the first aspect, the frame member may include a second hole in the vicinity of a first hole through which the leg portion of the support member passes, and the leg portion of the support member may include a protrusion that protrudes into the second hole.

Moreover, in the first aspect, the leg portion of the support member may protrude outward of the standing support portion.

Further still, in the first aspect, the support member may include, on a side surface of the optical member support portion, a light source support portion that supports the light sources.

A second aspect of the present invention provides a method of assembling a display device where a reflection plate is disposed on a frame member, a support member is disposed standing on and supported by the reflection plate, and then a light source and an optical member are disposed above the reflection plate, the method comprising: inserting, into holes disposed in the frame member and the reflection plate, a leg portion of the support member that protrudes downward of a standing support portion disposed standing on and supported by the reflection plate and is bent in a direction along the standing support portion; and sliding the support member in the direction in which the leg portion is bent such that the frame member and the reflection plate are fitted between and supported by the standing support portion and the leg portion.

In the second aspect, the method may further comprise disposing a second hole in the vicinity of a first hole in the frame member through which the leg portion of the support member passes, and fitting a protrusion of the leg portion of the support member into the second hole to fix the support member.

As described above, in the display device of the present invention, the leg portion of the support member is bent in the direction along the standing support portion. At this time, the support member is disposed standing on and supported by the reflection plate by the method of the second aspect, and the reflection plate and the frame member are fitted between and fixed by the standing support portion and the leg portion. For this reason, damage to the leg portion can be reduced in comparison to a support member that fixes with the pawl shown in FIG. 17. Further, the protruding height of the leg portion can also be reduced.

Further, when the hole including parallel two sides is disposed in the reflection plate, not only is the support member slid along the parallel two sides when the display device is assembled by the method of the second aspect, but the workability of the assembly is improved.

Further, when the second hole is disposed in the frame member and the display device is assembled, the support member can be easily fixed.

Further, when the leg portion of the support member protrudes outward of the standing support portion, it becomes easier to align the direction of the support member with the hole in the reflection plate when the support member is to be attached to the reflection plate, and the workability is improved.

Further, at this time, the support member may also include the light source support portion that supports the light source.

BRIEF DESCRIPTION OF THE DRAWINGS

An embodiment of the present invention will be described below based on the following figures, wherein.

DETAILED DESCRIPTION OF THE INVENTION

The present invention will be described in detail below together with an embodiment with reference to the drawings.

It will be noted that, in all of the drawings for describing the embodiment, the same reference numerals will be given to members having the same functions, and redundant description thereof will be omitted.

In the display device of the invention, by making a shape that the leg portion of the support member which is disposed standing on the reflection plate is bent in a direction along the standing support of the support member, the damage upon attachment is prevented and further the protruding height is reduced. Also, by sliding and fixing the support member, the workability upon attachment is improved.

Figure 1:
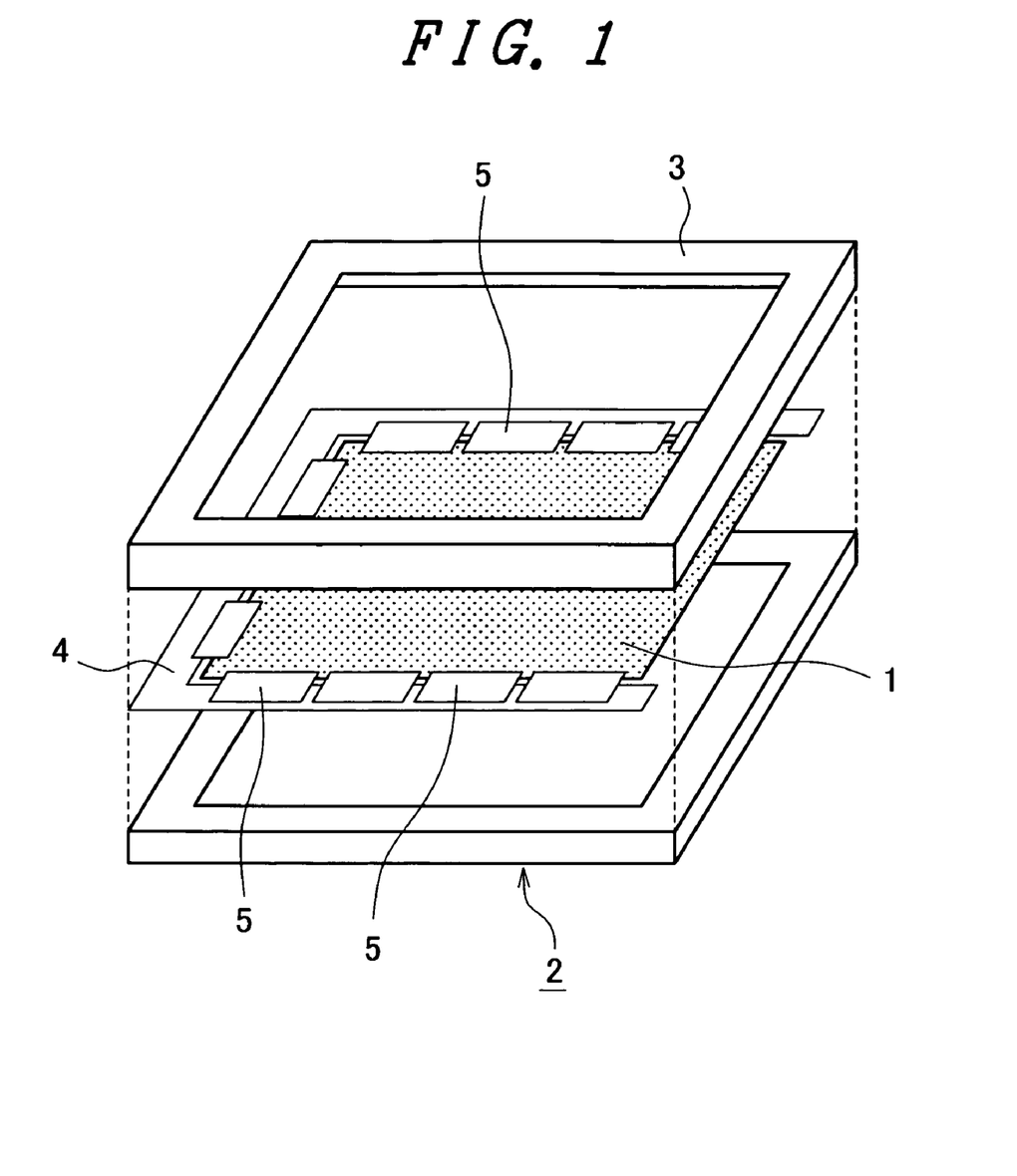
FIG. 1 is a schematic diagram showing the general configuration of a display device of the embodiment according to the invention, and is a perspective view showing the schematic configuration of the display device.
Figure 2:
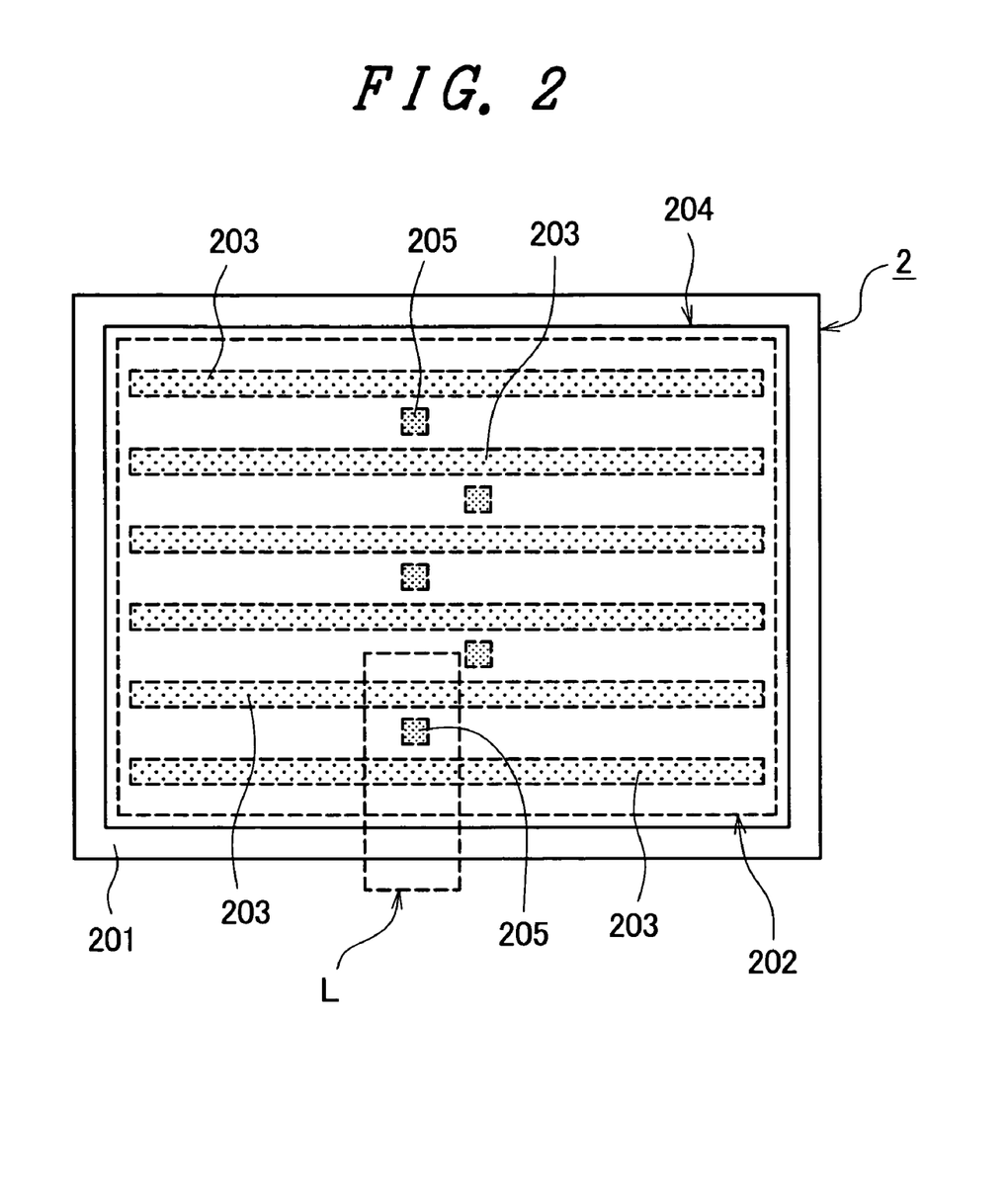
FIG. 2 is a schematic diagram showing the general configuration of the display device of the embodiment according to the invention, and is a front view showing a configural example of a backlight unit.
Figure 3:
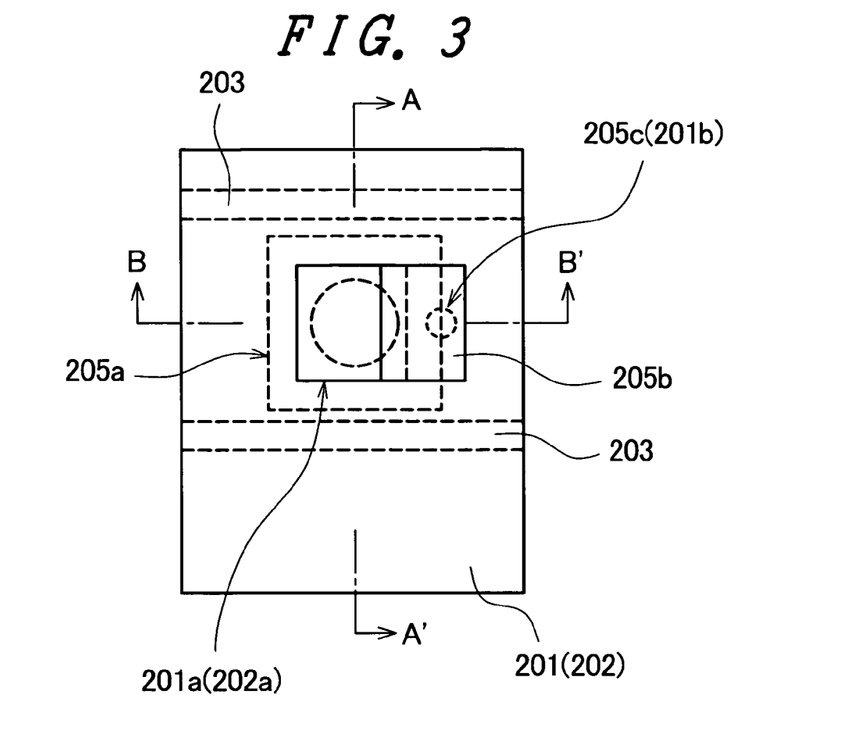
FIG. 3 is a schematic diagram showing the general configuration of the display device of the embodiment according to the invention, and is a bottom view of a region L shown in FIG. 2.
Figure 4:
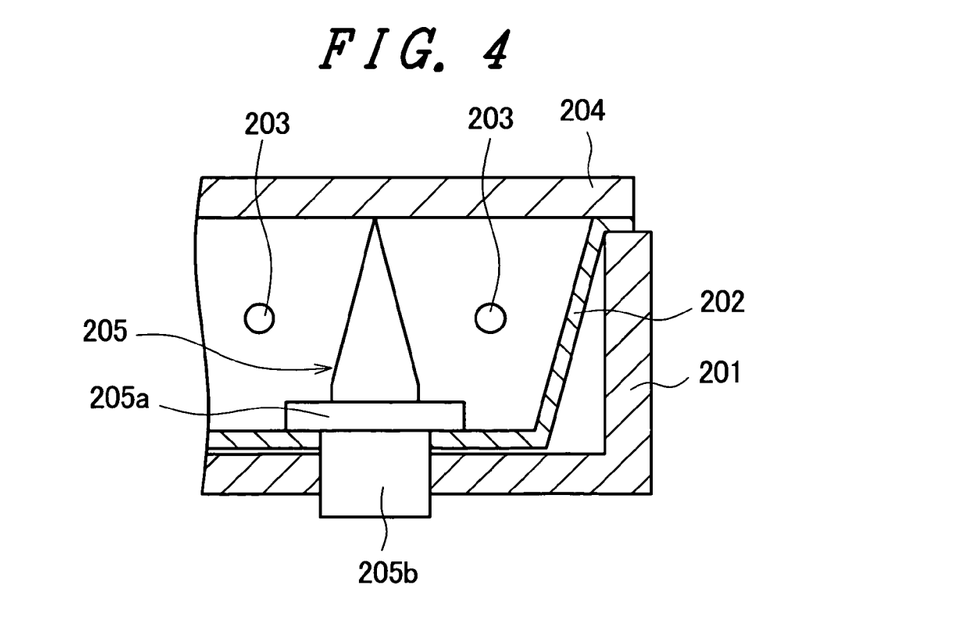
FIG. 4 is a schematic diagram showing the general configuration of the display device of the embodiment according to the invention, and is a cross-sectional view along line A-A' shown in FIG. 3.
Figure 5:
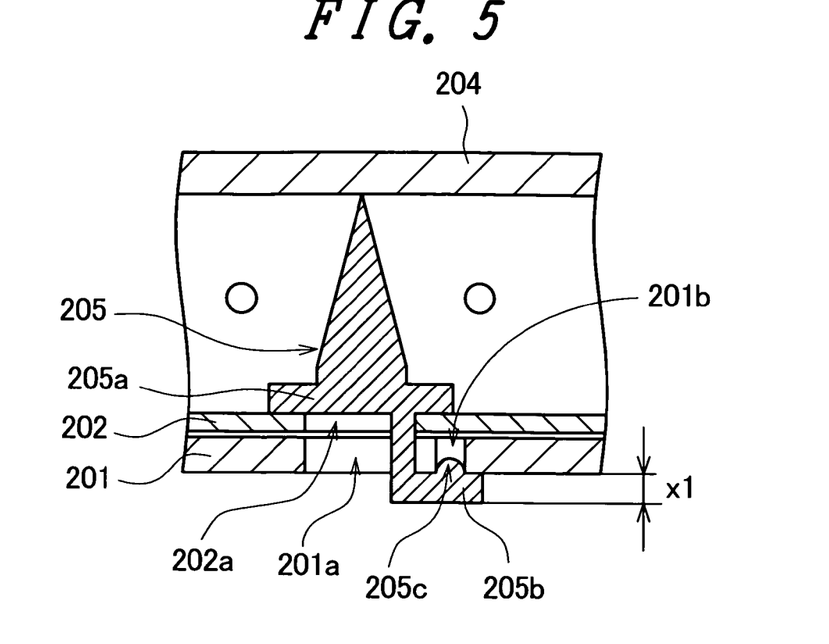
FIG. 5 is a schematic diagram showing the general configuration of the display device of the embodiment according to the invention, and is a cross-sectional view along line B-B' shown in FIG. 3.

FIGS. 1 to 5 are schematic diagrams showing the general configuration of a display device of an embodiment according to the present invention. FIG. 1 is a perspective view showing the general configuration of the display device, FIG. 2 is a front view showing a configural example of a backlight unit, FIG. 3 is a bottom view of a region L shown in FIG. 2, FIG. 4 is a cross-sectional view along line A-A' shown in FIG. 3, and FIG. 5 is a cross-sectional view along line B-B' shown in FIG. 3. It will be noted that FIGS. 4 and 5 are diagrams where up and down have been reversed.

In FIG. 1, 1 is a display panel, 2 is a backlight unit, 3 is a frame member (upper frame), 4 is a printed circuit board, and 5 are semiconductor packages. Further, in FIGS. 2 to 5, 201 is a frame member (lower frame), 201a are holes through which leg portions of support members pass, 201b are holes into which protrusions of the leg portions fit, 202 is a reflection plate, 202a are holes through which the leg portions of the support members pass, 203 are light sources, 204 is an optical member, 205 are the support members, 205a are standing support portions of the support members 205, 205b are the leg portions of the support members 205, and 205c are the protrusions of the leg portions 205b.

As shown in FIG. 1, the display device of the present embodiment includes the display panel 1, the backlight unit 2 disposed under (behind) the display panel 1, and the frame member (upper frame) 3 that integrally supports the display panel 1 and the backlight unit 2. Further, the printed circuit board 4 is disposed on the outer peripheral portion of the display panel 1, and wires of the display panel land wires of the printed circuit board 4 are electrically connected via the semiconductor packages 5, which comprise a tape carrier package (TCP) on which a driver IC is mounted or a chip on film (COF), for example. Further, although it is not shown, the printed circuit board 4 is electrically connected to another circuit board including a circuit such as a timing controller, for example.

The display panel 1 is a transmissive display panel, such as a liquid crystal display panel, and presents images and video by transmitting the light from the backlight unit 2.

Further, the backlight unit 2 is a sub-unit where the light sources are disposed behind the display panel 1. For example, as shown in FIGS. 2 to 5, the reflection plate 202 is housed in the frame member (lower frame) 201, and the light sources 203, which comprise cold-cathode fluorescent tubes, for example, are plurally disposed above (in front of) the reflection plate 202. Further, an optical member 204 such as a light diffusion plate or an optical sheet is disposed above the light sources 203.

Further, at this time, the support members 205 that support the optical member 204 are disposed standing on the reflection plate 202. The support members 205 are for preventing the optical member 204 from bending or warping. For example, as shown in FIG. 2, the support members 205 are disposed standing on plural places on the reflection plate 202.

Further, in the display device of the present embodiment, the support members 205 include the leg portions 205*b* that are disposed on the rear sides of the standing support portions 205*a* contacting the reflection plate 202, pass through the holes 202*a* and 201*a* in the reflection plate 202 and the lower frame 201, and have shapes that are bent in the direction along the standing support portions 205*a*. Additionally, the support members 205 are disposed standing on and supported by the reflection plate 202 as a result of the reflection plate 202 and the lower frame 201 being fitted between the standing support portions 205*a* and the leg portions 205*b*.

Further, at this time, the second holes 201*b* are disposed in the lower frame 201 in the vicinity of the first holes 201*a* through which the leg portions 205*b* of the support members 205 pass. Additionally, the protrusions 205*c* that fit into the second holes 201*b* are disposed on the leg portions 205*b* of the support members 205.

Figure 6:
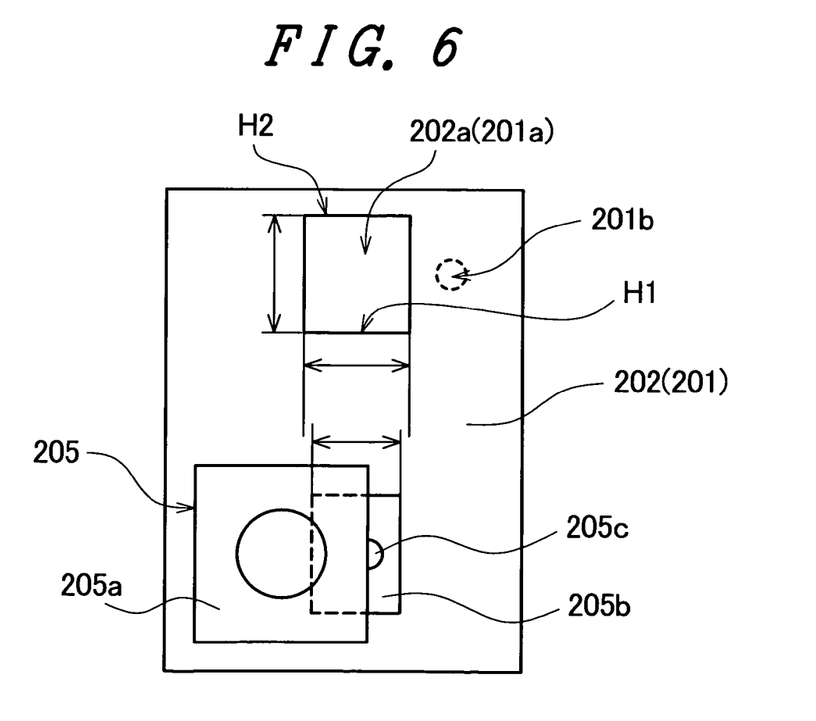
FIG. 6 is a schematic diagram for describing a method of assembling the display device of the embodiment, and is a diagram describing a method of inserting a leg portion of a support member.
Figure 7:
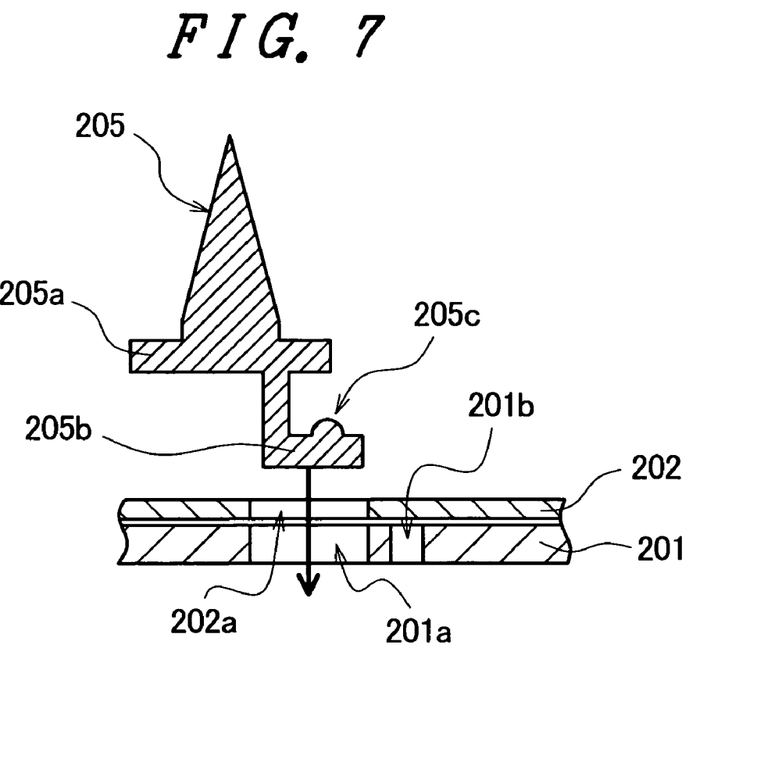
FIG. 7 is a schematic diagram for describing the method of assembling the display device of the embodiment, and is a side sectional view of FIG. 6.
Figure 8:
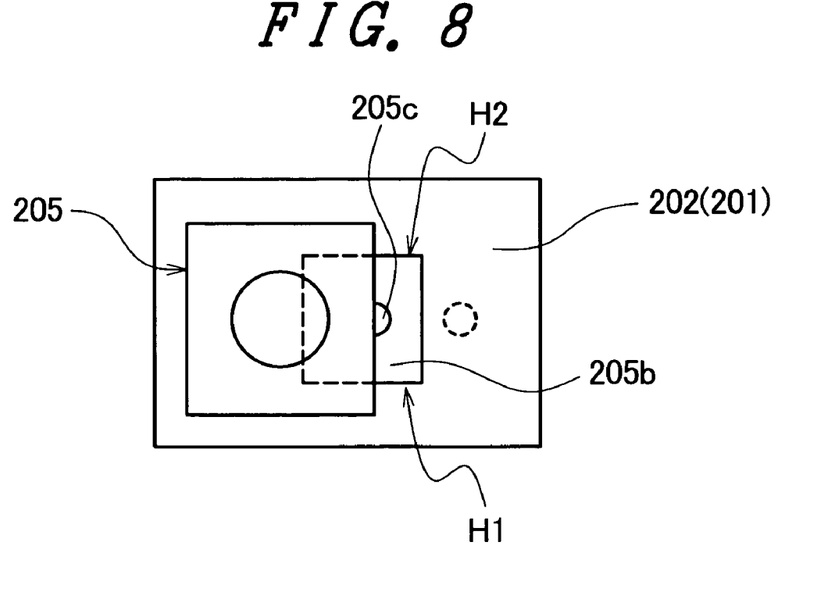
FIG. 8 is a schematic diagram for describing the method of assembling the display device of the embodiment, and is a diagram describing a method of fixing the support member.
Figure 9:
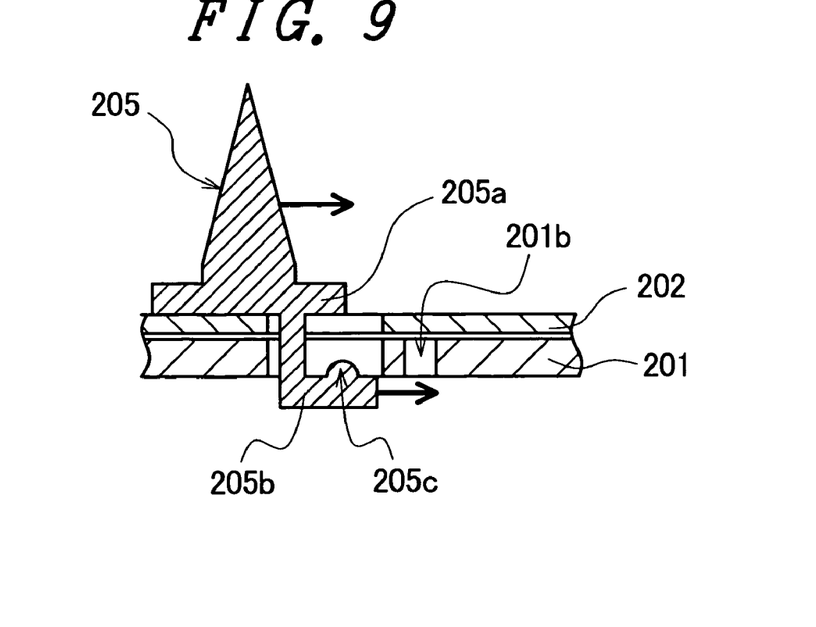
FIG. 9 is a schematic diagram for describing the method of assembling the display device of the embodiment, and is a side sectional view of FIG. 8.

FIGS. 6 to 9 are schematic diagrams for describing a method of assembling the display device of the present embodiment. FIG. 6 is a diagram describing a method of inserting the leg portions 205*b* of the support members 205, FIG. 7 is a side sectional view of FIG. 6, FIG. 8 is a diagram describing a method of fixing the support members 205, and FIG. 9 is a side sectional view of FIG. 8.

When the display device of the present embodiment is to be assembled, first, the reflection plate 202 is disposed on the lower frame 201, and the support members 205 are disposed standing. At this time, as shown in FIGS. 6 and 7, the holes 201*a* and 202*a*, which are larger than the outer shapes of the leg portions 205*b* of the support members 205 and are smaller than the outer shapes of the standing support portions 205*a*, are formed in the lower frame 201 and the reflection plate 202. Further, at this time, the holes (second holes) 201*b*, into which the protrusions 205*c* of the leg portions 205*b* fit, are formed in the lower frame 201. Additionally, the leg portions 205*b* of the support members 205 are inserted into the holes 201*a* and 202*a* in the lower frame 201 and the reflection plate 202.

Further, as shown in FIG. 6, for example, the holes formed in the lower frame 201 and the reflection plate 202—that is, the holes 201*a* and 202*a* into which the leg portions 205*b* of the support members 205 are inserted—are rectangular holes having two sides H1 and H2 that are parallel to the direction facing the second holes 201*b* in the lower frame 201.

Further, at this time, it is preferable for the leg portions 205*b* of the support members 205 to have a length that protrudes outward of the standing support portions 205*a*. By configuring the leg portions 205*b* in this manner, the leg portions 205*b* can be easily aligned with and inserted into the holes 201*a* and 202*a* in the lower frame 201 and the reflection plate 202 using the protruding portions of the leg portions 205*b*. Further, when the rectangular holes 201*a* and 202*a* are disposed in the lower frame 201 and the reflection plate 202, the direction of the support members 205 can also be easily aligned by changing the lengths of the two sides H1 and H2 parallel to the direction facing the second holes 201*b* and the lengths of the remaining two sides connected to the parallel two sides H1 and H2.

Additionally, as shown in FIGS. 8 and 9, when the leg portions 205*b* of the support members 205 are inserted into the holes 201*a* and 202*a* in the lower frame 201 and the reflection plate 202, the support members 205 are slid such that the lower frame 201 and the reflection plate 202 are fitted between and fixed by the standing support portions 205*a* and the leg portions 205*b* of the support members 205. At this time, the support members 205 are fixed as a result of the protrusions 205*c* of the leg portions 205*b* being fitted into the second holes 201*b* in the lower frame 201. Further, at this time, the support members 205 are merely slid along the parallel two sides H1 and H2 of the holes 201*a* and 202*a* in the lower frame 201 and the reflection plate 202, thereby they can also be easily fixed.

When the support members 205 are attached to the reflection plate 202 by the sequence shown in FIGS. 6 to 9, then the light sources 203 are disposed and the optical member 204 is disposed in the same manner as in conventional assembly methods. Then, the display panel 1 and the printed circuit board 4 are superposed and the upper frame 3 and the lower frame 201 are fixed.

Further, after the upper frame 3 and the lower frame 201 have been fixed, a circuit board including a circuit such as a timing controller is attached to the underside of the lower frame 201, for example. In the display device of the present embodiment, a protruding height ×1 of the leg portions 205*b* of the support members 205 shown in FIG. 5, for example, is about 1 mm. On the other hand, the protruding height ×2 of the conventional leg portions 205*b* of the support members 205 shown in FIG. 17, for example, is about 5 mm. That is, in the display device of the present embodiment, the protruding height ×1 of the support members 205 can be reduced in comparison to what has conventionally been the case. For this reason, when the circuit board is attached to the region where the leg portions 205*b* of the support members 205 protrude, the attachment height of the circuit board can be reduced and the display device can be made thinner as a result.

As described above, according to the display device of the present embodiment, the leg portions 205*b* of the support members 205 are inserted into the holes 201*a* and 202*a* in the lower frame 201 and the reflection plate 202, and then the support members 205 are slid, whereby the support members 205 can be easily fixed and the workability of attaching the support members 205 is improved.

Further, because the leg portions 205*b* of the support members 205 protrude outward of the standing support portions 205*a*, the directions and positions of the support members 205 can be easily aligned when the support members 205 are to be attached.

Further, because the protruding height ×1 of the leg portions 205*b* of the support members 205 can be reduced in comparison to what has conventionally been the case, the attachment height of the circuit board can be reduced when the circuit board is attached to the region where the leg portions 205*b* of the support portions 205 protrude.

Further, in the support members 205 of the present embodiment, the pawls 205f of the conventional support members 205 shown in FIG. 17 are unnecessary, and problems such as the leg portions 205b of the support members 205 becoming chipped and extraneous or the fixing becoming insufficient are prevented.

FIGS. 10 to 16 are schematic diagrams for describing modifications of the preceding embodiment.

Figure 10:
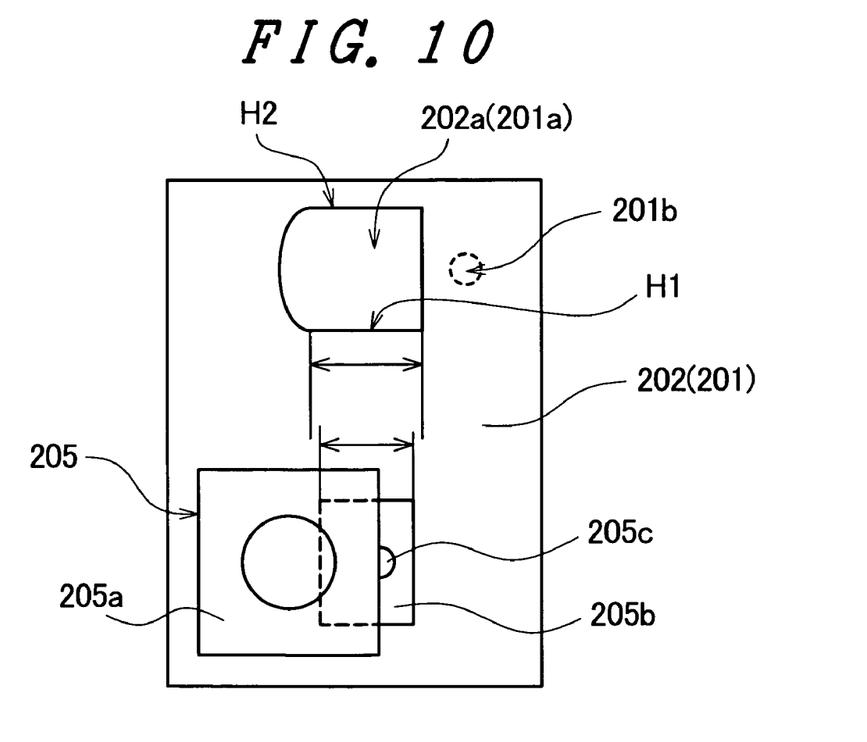
FIG. 10 is a schematic diagram for describing a modification of the embodiment.

In the display device of the preceding embodiment, the holes 201a and 202a into which the leg portions 205b of the support members 205 are inserted had rectangular shapes as shown in FIG. 6, for example. However, in the present invention, it suffices for the holes 201a and 202a in to which the leg portions 205b of the support members 205 are inserted to be holes having the two sides H1 and H2 parallel to the direction facing the second holes 201b in the lower frame 201. For this reason, as shown in FIG. 10, for example, one of the sides connected to the parallel two sides H1 and H2 may also be curved. In this case, by making the side closest to the second hole 201b a straight line and making the side farthest from the second hole 201b a curved line, the direction of the support members 205 can be easily aligned even when the second holes 201b in the lower frame 201 are hidden by the reflection plate 202 and cannot be seen, as shown in FIG. 10, for example.

Figure 11:
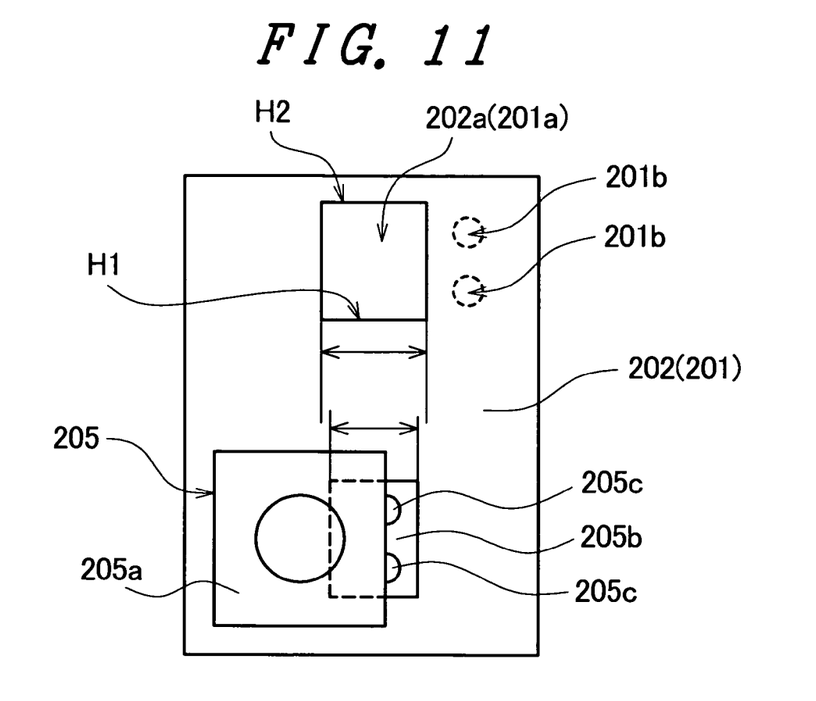
FIG. 11 is a schematic diagram for describing a modification of the embodiment.
Figure 12:
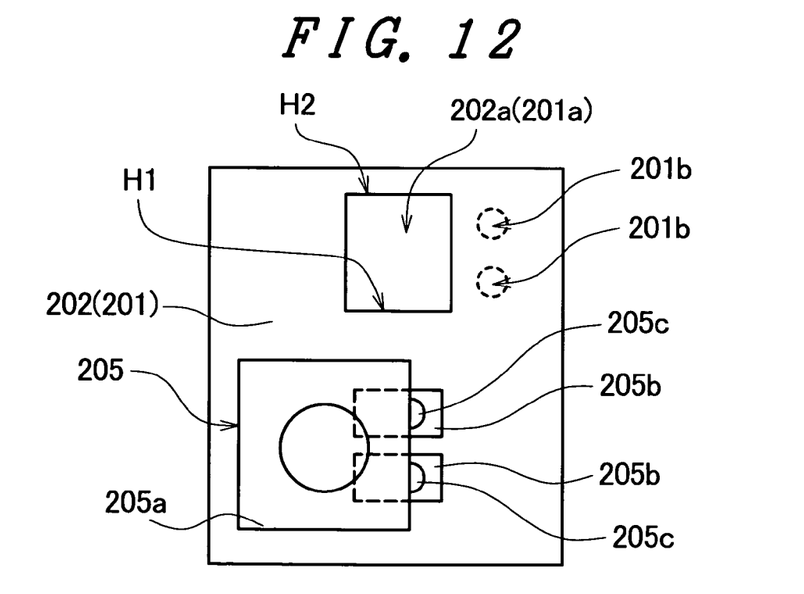
FIG. 12 is a schematic diagram for describing a modification of the embodiment.
Figure 13:
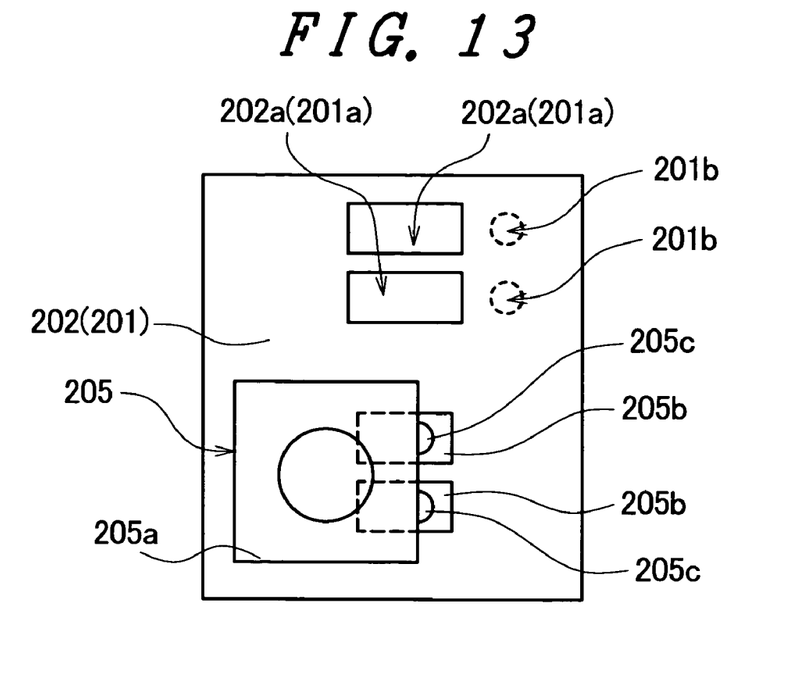
FIG. 13 is a schematic diagram for describing a modification of the embodiment.

Further, in the preceding embodiment, each of the leg portions 205b of the support members 205 included just one protrusion 205c, and a single hole 201b was disposed in the lower frame 201 in correspondence to each of the protrusions 205c, but the present invention is not limited to this. For example, as shown in FIG. 11, each of the leg portions 205b may include a pair of protrusions 205c, and a pair of second holes 201b may be disposed in the lower frame 201 in correspondence to each of the pairs of protrusions 205c. Further, at this time, the leg portions 205b of the support members 205 maybe divided into two, as shown in FIG. 12. Further, when the leg portions 205b of the support members 205 are divided into two, the holes 201a and 202a in the lower frame 201 and the reflection plate 202 may also be divided into two, as shown in FIG. 13, for example. Further, although FIGS. 11 to 13 illustrate examples where there are pairs of the protrusions 205c of the leg portions 205b of the support members 205 and of the second holes 201b, the present invention is not limited to this. There may also be three or more of each of the protrusions 205c and the second holes 201b.

Figure 14:
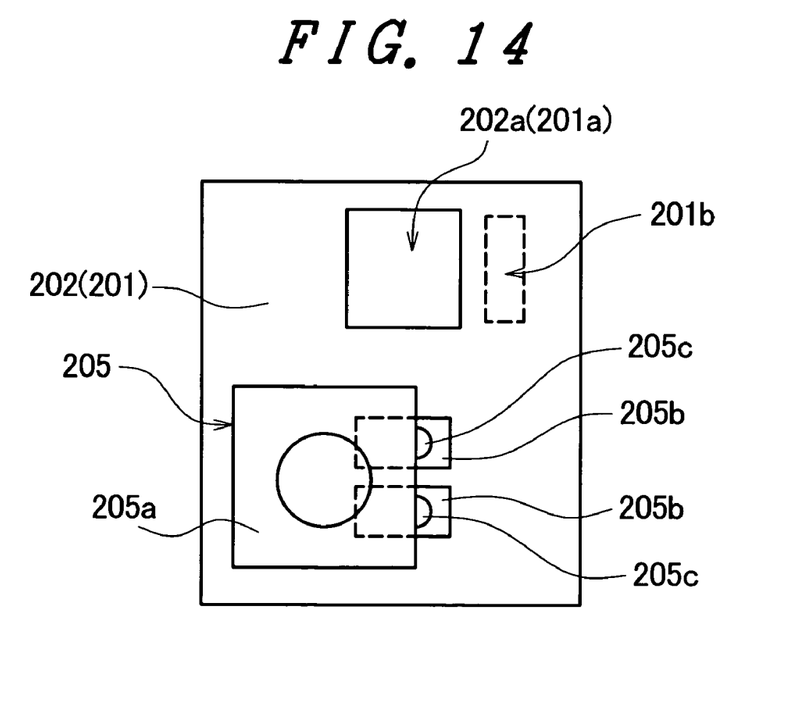
FIG. 14 is a schematic diagram for describing a modification of the embodiment.

Further, when two protrusions 205c are disposed on each of the leg portions 205b of the support members 205, each of the second holes 201b in the lower frame 201 may also comprise a single large hole 201b that can house the two protrusions 205b, as shown in FIG. 14, for example.

Further, although it is not shown, the protrusions 205c of the leg portions 205b of the support members 205 are not limited to the hemispherical shape shown in FIG. 6 but may also be rectangular parallelepiped protrusions, for example.

Figure 15:
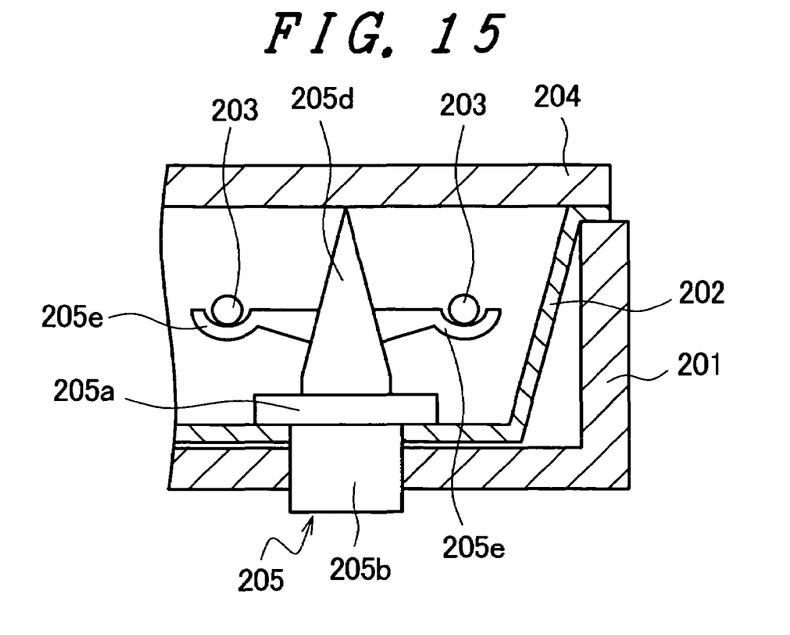
FIG. 15 is a schematic diagram for describing a modification of the embodiment.

Further, the support members 205 are not limited to simply supporting the optical member 204, for example, but may also be supports that also support the light sources 203. In this case, as shown in FIG. 15, for example, light source support portions 205e that support the light sources 203 may be disposed on the side surfaces of optical member support portions 205d on the standing support portions 205a of the support members 205.

Figure 16:
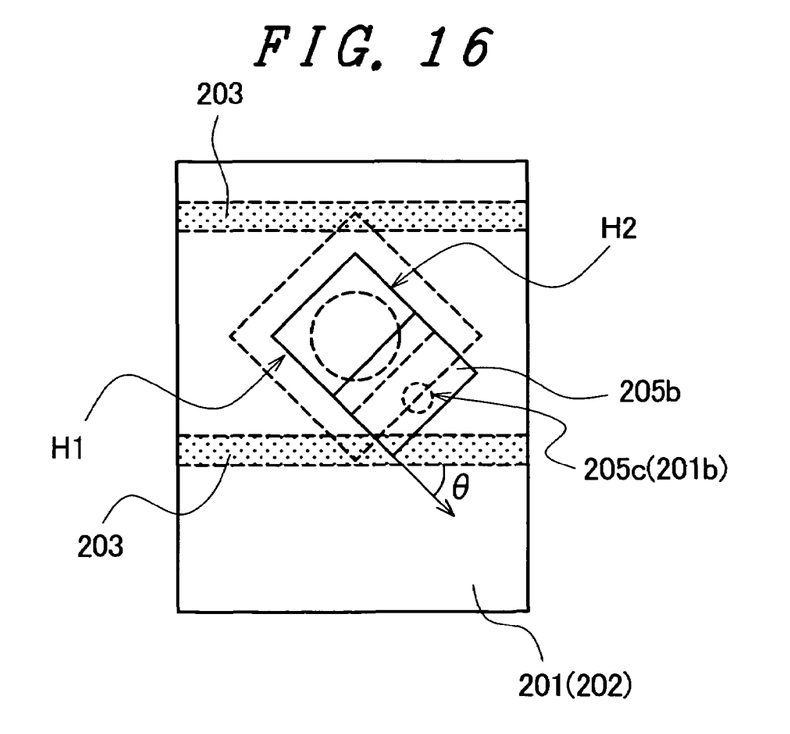
FIG. 16 is a schematic diagram for describing a modification of the embodiment.

Further, in the preceding embodiment, the holes 201a and 202a in the lower frame 201 and the reflection plate 202 were formed such that the parallel two sides H1 and H2—or in other words, the sliding direction of the support members 205—were parallel to the extension direction of the light sources 203. However, the holes 201a and 202a are not limited to this. For example, as shown in FIG. 16, the holes 201a and 202a may also be holes where the sliding direction of the support members 205 is slanted θ degrees with respect to the extension direction of the light sources 203.

The present invention has been specifically described on the basis of the preceding embodiment, but the present invention is not limited to the preceding embodiment and can be variously altered in a range that does not depart from the spirit thereof.

What is claimed is:

1. A display device comprising:
   a reflection plate;
   plural light sources disposed above the reflection plate;
   an optical member disposed above the plural light sources;
   a support member disposed standing on a bottom surface of the reflection plate;
   a frame member that houses the reflection plate and the light sources; and
   a display panel disposed above the optical member,
   wherein the support member includes
   a standing support portion that is disposed standing on and supported by the reflection plate,
   an optical member support portion that supports the optical member, and
   a leg portion that protrudes downward of the reflection plate and the frame member and is bent in a direction along the standing support member.

2. The display device of claim 1, wherein
   the reflection plate includes a hole through which the leg portion of the support member passes, and
   the hole in the reflection plate includes two sides parallel to the direction in which the leg portion of the support member is bent.

3. The display device of claim 1, wherein
   the frame member includes a second hole in the vicinity of a first hole through which the leg portion of the support member passes, and
   the leg portion of the support member includes a protrusion that protrudes into the second hole.

4. The display device of claim 1, wherein the leg portion of the support member protrudes outward of the standing support portion.

5. The display device of claim 1, wherein the support member includes, on a side surface of the optical member support portion, a light source support portion that supports the light sources.

6. A method of assembling a display device where a reflection plate is disposed on a frame member, a support member is disposed standing on and supported by the reflection plate, and then a light source and an optical member are disposed above the reflection plate, the method comprising:
   inserting, into holes disposed in the frame member and the reflection plate, a leg portion of the support member that protrudes downward of a standing support portion disposed standing on and supported by the reflection plate and is bent in a direction along the standing support portion; and
   sliding the support member in the direction in which the leg portion is bent such that the frame member and the reflection plate are fitted between and supported by the standing support portion and the leg portion.

7. The display device assembly method of claim 6, further comprising
   disposing a second hole in the vicinity of a first hole in the frame member through which the leg portion of the support member passes, and
   fitting a protrusion of the leg portion of the support member into the second hole to fix the support member.

* * * * *